Dec. 25, 1956  C. R. BELL  2,775,420
BEAM CHANGE PRE-CONDITIONER AUTOMATIC PILOTS
Filed Jan. 23, 1952
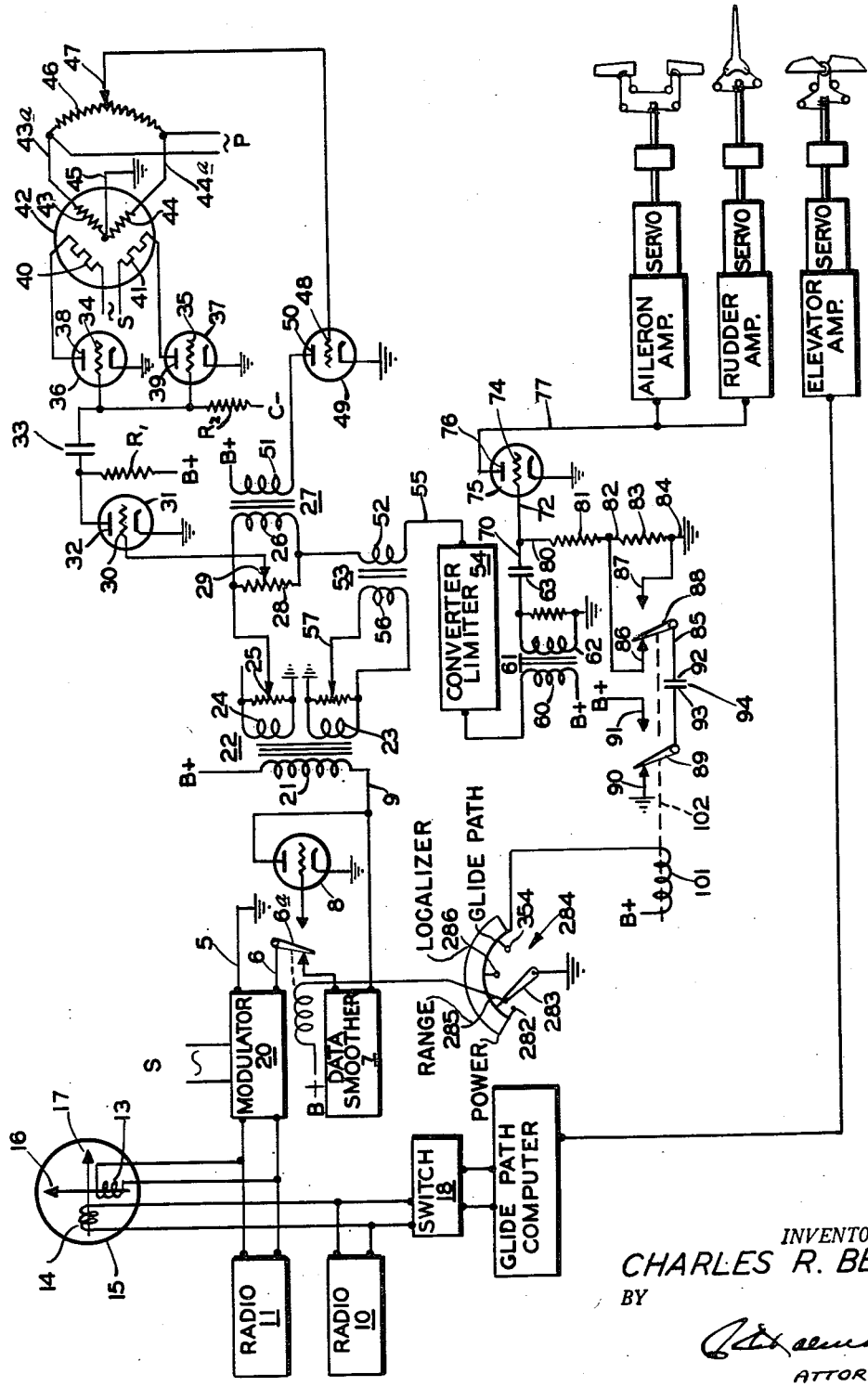
INVENTOR.
CHARLES R. BELL
BY
ATTORNEY

United States Patent Office 2,775,420
Patented Dec. 25, 1956

2,775,420

BEAM CHANGE PRE-CONDITIONER AUTOMATIC PILOTS

Charles R. Bell, Bergenfield, N. J., assignor to Bendix Aviation Corporation, Teterboro, N. J., a corporation of Delaware Application January 23, 1952, Serial No. 267,829

11 Claims. (Cl. 244—77)

This invention relates generally to beam guidance systems for aircraft and more particularly to systems wherein provision is made to precondition the system to assume smooth control of the craft in accordance with preselected radio beams.

It has been common practice to operate aircraft or other mobile bodies by automatic pilots directed by radio beams transmitted from some station remotely located from the aircraft. Frequently, several beams of different characteristics are used in the navigation of the aircraft. This had presented a number of problems. When the automatic pilot was made to respond to different guidance beams of different characteristics, as for example when a transition was made from range to localizer guide beams, the response of the aircraft was immediate. When the action called for by the beams or the automatic pilot responsive to the beams was substantially the same, no difficulty was experienced. However, when, as it usually happens, the control conditions were widely different, the immediate response disturbed the equilibrium of the automatic pilot system. Accordingly, the flight surfaces were subjected to extreme control action with attendant violent maneuvering of the aircraft resulting in discomfort to the passengers and undue stresses on the aircraft before the equilibrium of the system could be restored to give the desired smooth flying characteristics for the aircraft.

It is an object of the present invention, therefore, to provide a novel arrangement for beam guided aircraft embodying novel provision for preconditioning the automatic pilot system for transfer from one beam to another whereby smooth flight control is presented at all times.

Another object of the invention is to provide a novel arrangement to permit only gradual transitions to be made from one beam guidance condition to another.

A further object of the invention is to provide a novel means for the shift to be made in the automatic pilot from one control condition to another without creating violent disturbing conditions in the equilibrium of the automatic pilot system.

Another object is to provide a novel switching arrangement for an electric circuit that permits only a gradual change in the circuit when different supply sources are connected thereto.

A further object is to provide a novel device to ease the resultant action on aircraft control surfaces as the automatic pilot for the aircraft is made to respond to different radio beams.

A still further object is to provide a novel manner for modulating the output of a thermionic tube.

Another object is to provide a novel electric circuit wherein the output of the circuit will be smoothly changed when the input is switched from one condition to another.

The above and other advantages of the invention will appear more fully hereinafter from a consideration of the detailed description which follows, taken together with the accompanying drawing wherein one embodiment of the invention is illustrated. It is to be expressly understood however, that the drawing is for the purpose of illustration and description only, and is not designed as a definition of the limits of the invention.

In the drawing, the single figure is a schematic diagram illustrating the novel flight smoothing circuit of the present invention.

The novel arrangement for permitting the automatic pilot of aircraft to be transferred from one beam guidance condition to another is designed for, but not restricted to, apparatus for the automatic control of mobile craft of the type described in copending application Serial No. 705,524, filed October 25, 1946 by Paul A. Noxon et al., and now U. S. Patent No. 2,592,173, issued April 8, 1952.

Referring to the drawing, an embodiment of the novel transition arrangement is shown in connection with an automatic pilot. A radio 10 receives glide path beam transmissions from a transmitting station on the ground at the landing strip. A radio 11 similarly receives transmissions from a localizer transmitter.

Each radio is connected with a coil 13 or 14 of an indicator 15 and sends to its respective coil a D. C. current, representing deviation from the beam. The coils regulate the position of cross pointers 16 and 17 to give the human pilot visual evidence of the craft's deviation from the localizer and glide path beams.

Radio 10 for receiving glide path transmissions is also connected through a suitable switch 18 to a glide path computer for controlling, when engaged, the attitude of the aircraft through the amplifier and servomotor for the elevator surfaces.

Radio 11 for receiving localizer or range transmissions is connected with a modulator 20. Modulator 20 changes the relatively weak D. C. signal received from radio 11 into a workable A. C. signal of varying phase and amplitude. A more detailed description of one type of modulator is found in copending application Serial No. 700,234, filed September 30, 1946, and now U. S. Patent No. 2,678,419, dated May 11, 1954.

One output lead 5 of modulator 20 is grounded. The other lead 6 is connected through selectively movable relay arm 6a to either a data smoother 7 or an amplifier tube 8. By a suitable relay means, relay arm 6a is actuated when switch arm 283 is at the range station 285 to pass the signal through the data smoother 7. At other times, the signal is passed through amplifier 8.

Data smoother 7 is a thermionic thermal time delay circuit somewhat similar to the rate deriving circuit described below. The data smoother serves to smooth the response of the automatic pilot to erratic beam patterns such as frequently are encountered when tracking the range beam. It can do this because the thermal time delay tube circuit will allow response only to a sustained signal from the modulator 20. For a full description of this circuit reference is made to copending application Serial No. 168,776, filed June 17, 1950, now U. S. Patent No. 2,680,193, dated June 1, 1954, and assigned to the assignee of the present invention.

Data smoother 7 and the plate of amplifying tube 8 are connected by way of lead 9 to the primary winding 21 of an input transformer 22 and thence to a plate supply such as the positive terminal of a suitable source of D. C. current B+.

Transformer 22 is the input to a rate deriving or dampening circuit which is fully described in copending application Serial No. 90,236, filed April 28, 1949.

Transformer 22 of the rate deriving circuit illustrated herein has two grounded secondary windings 23 and 24 each with variable tapped resistances connected thereacross. Tap 25 of the resistance across winding 24 is connected to a winding 26 of a feedback transformer 27. Across winding 26 is a variable tapped resistance 28 having a tap 29 connected to the grid 30 of an amplifier tube 31. Plate 32 is connected through condenser 33 to the grids 34 and 35 of a pair of discriminator tubes 36 and 37. A plate supply for plate 32 is provided through resistor $R_1$ by a suitable source of D. C. current B+. A grid supply source for grids 34 and 35 is obtained through resistor $R_2$ from a suitable D. C. source C—.

Plates 38 and 39 of discriminators 36 and 37 are connected to the heater elements 40 and 41 of a glass enclosed thermal time delay tube 42. The delay tube 42 in this embodiment is the type described in U. S. Patent No. 2,463,805 issued March 8, 1949, to Polye et al. Also connected to the heater elements is a suitable A. C. power source S in phase with the A. C. power source to modulator 20.

In heat exchange relationship with heater elements 41 and 41 are the resistors 43 and 44 joined together inside the tube. Connected across the external leads 43a and 44a is a variable tapped resistor 46. Connected to the junction of resistor 46 and leads 43a and 44a is a suitable power source P of a phase such that the signal appearing at winding 57 is in opposition to the phase of the signal appearing at winding 26 of transformer 27.

It is apparent that a normally balanced Wheatstone bridge is presented which consists of four diagonals: one diagonal being resistor 43 and lead 43a; another being resistor 44 and lead 44a; a third, the portion of resistor 46 between tap 47 and the junction of itself with 43a; and a fourth, the portion of resistor 46 between tap 47 and its junction with lead 44a. The input power supply is P. The output is defined by grounded lead 45 and tap 47 connected to a grid 48 of an amplifier tube 49. When either resistor 43 or 44 becomes heated because of its heat exchange relationship with heater 40 or 41, the bridge becomes unbalanced and a potential is established on tap 47 onto grid 48.

Plate 50 of amplifier 49 is connected to winding 51 of transformer 27 and thence to a suitable plate supply, such as a positive D. C. source B+.

Winding 26 is connected to one end of a winding 52 of a mixing transformer 53; the other end of winding 52 is connected to a converter limiter 54 by way of lead 55. One end of a winding 56 of transformer 53 is connected to secondary winding 23, whereas the other end is connected to the variable tap 57 of the resistor across winding 23.

The converter limiter 54 acts as a safety device by limiting the maximum signal level that can be passed through it to the aileron and rudder controls. It also acts to take out much of the undesirable spurious component that usually appears in the signal. This device has been fully explained in copending application Serial No. 117,476, filed September 23, 1949, and now abandoned; accordingly, the details thereof are not included in this specification.

The output terminal of converter limiter 54 is connected to the primary winding 60 of a transformer 61 whose secondary winding 62 is connected through a capacitance 63 to a conductor 70.

Conductor 70 is thus connected at one end to a signal source and at the other end to the parallel conductors 72 and 80. Conductor 72 is connected to a grid 74 of an amplifying tube 75 whose plate 76 is connected by lead 77 to the rudder and aileron amplifier channels.

The above description covers the heretofore known automatic pilot. While it works well, it does have the disadvantage mentioned before, namely, that changes from one beam to another, as for instance from range beam to localizer beam guidance, may involve violent control action and maneuvering before the aircraft can proceed to fly smoothly again.

An embodiment of the novel arrangement to soften or modulate the control action on the aircraft when the guidance conditions of the automatic pilot are changed now follows.

A lead 80, joined to conductor 70 at one end, is connected to a resistor 81 which, in turn, is connected by a lead 82, a resistor 83, and a lead 84 to ground.

A relay indicated generally at 85 has one contact 86 connected to lead 82 and a second contact 87 connected to lead 84 with a selectively movable relay arm 88 therebetween. Another relay arm 89 is selectively movable between a grounded contact 90 and a contact 91 connected to the positive terminal B+ of a suitable D. C. source. Connected between the relay arms is a capacitor, denoted generally at 94 as having plates 92 and 93.

A solenoid 101 to move relay arms 88 and 89 by means of shaft 102 has one end connected at B+ to a suitable power source and the other end connected through a sequence switch, denoted generally at 284, and sequence switch arm 283 to ground. The details of the sequence switch 284 are described in the before mentioned application Serial No. 705,524, and accordingly are not repeated in this application.

Briefly outlined, the sequence switch serves two functions: it connects the system to the radio-receiving equipment and at the same time permits selection of the operating function. Terminal 282 when engaged by sequence switch arm 283 puts power into the circuit of the automatic pilot to warm up the cathodes of the various thermionic tubes and otherwise ready the automatic pilot for instant operation. Terminal 285, when engaged by sequence switch arm 283, places the automatic pilot on the range beam for cross country flying. Terminal 286 when engaged by arm 283 shifts the master control of the automatic pilot to the localizer beam. Terminal 354 when engaged by arm 283 shifts the master control of the automatic pilot to both the localizer and glide path beams for blind landing operations.

*Operation*

In the operation of the automatic pilot, using the localizer beam transmission as an example, radio 11 receives a signal in accordance with the lateral displacement of the craft horizontally from the beam. The radio then generates a D. C. signal which is sent to indicator 15 for the human pilot's visual benefit and also to the modulator 20. Modulator 20 then generates an A. C. signal of varying phase and amplitude in accordance with the D. C. signal received and impresses the signal on primary winding 21 of transformer 22.

The signal induced in secondary winding 23 is communicated through transformer 53, lead 55, converter limiter 54, and transformer 61, then is amplified by tube 75 and is passed through conductor 77 to the amplifiers of the servomotors for the ultimate actuation of the respective rudder and aileron control surfaces.

The signal induced on secondary winding 24 is conducted through tap 25 to winding 26 of transformer 27 and resistance 28 to form a damping signal as is explained in greater detail in the aforesaid copending application Serial No. 90,236. This damping action steadies the craft on course, for example, by reducing any overrunning of the beam when a correction is made for displacement from the beam.

Briefly, the signal from tap 29 is amplified by tube 32 and impressed on discriminator tubes 36 and 37, causing either discriminator tube 36 or 37 to conduct depending upon the phase of the signal. This results in one of the heater elements 40 or 41 heating up and the consequent heating of resistor 43 or 44 in heat exchange relationship therewith. The Wheatstone bridge formed by these resistors is unbalanced due to the change in resistance as the resistor becomes heated. Consequently, a signal appears at tap 47 which is conducted to tube 49 where it is amplified and then impressed on secondary winding 51 of transformer 27.

The signal from the rate circuit impressed on the one winding 51 of transformer 27 is of a phase in opposition to the displacement signal from modulator 20 impressed through transformer 22 onto secondary winding 24 and thence onto the other winding 26 of transformer 27. The net effect is that when the signal from modulator 20 is steady, the signal appearing on winding 26 tends to be cancelled by the signal appearing on winding 51. When the signal on winding 26 is rising in strength, it is greater than the signal on winding 51. Conversely, when the signal on winding 26 is falling, the signal on winding 51 is of greater strength. The resultant of these signals, representing the rate of signal change, is added to the signal, representing displacement from the beams, is induced on winding 52 of mixing transformer 53 by the winding 56 which receives its signal from secondary winding 23 of transformer 21. The resultant of the rate and displacement signals is communicated through conductor 55 to converter 54 and finally, to the channel amplifiers to actuate the aileron and rudder surfaces as outlined above.

As explained in application Serial No. 705,524, mentioned above, the human pilot when flying from one airport to another may first set the automatic pilot to fly on the range beam between the airports and then set the automatic pilot to make an automatic approach on the localizer and glide path beams at the aircraft's destination. After take-off, the human pilot tunes the radio to the frequency of the visual range and manually controls the craft to intersect or bracket the beam. He can tell when this condition is reached because the cross pointer 15 will be centered or at zero.

At the same time that he is manually flying the ship to intersect the beam he moves sequence switch arm 283 to power terminal 282 for a "warm-up" interval to ready the automatic pilot for instant operation. When the craft is in the desired position with respect to the beam, the human pilot moves the sequence switch 283 to range terminal 285 and the craft will automatically fly down the range system tracking the range beam toward the craft's destination.

As the craft nears its destination but yet is perhaps twelve to fifteen miles away, and the human pilot desires to use the automatic approach procedure, he turns the sequence switch back to power terminal 282 to disengage the range control, leaving the craft under the control of the automatic pilot. Then he tunes the radios to the frequencies of the approach or localizer control systems. The speed of the craft is then reduced to approach speed. When the localizer beam is intersected, sequence switch 283 is turned to localizer terminal 286. Thereafter the craft is flown to intersect the glide beam, and when the latter is intersected, switch 283 is moved to glide path terminal 354. The craft is then guided automatically to approximately 200 ft. of the landing strip at which point the human pilot takes over the controls and manually lands the craft.

When flying on localizer beam alone the system functions essentially in the same manner as it does while tracking range beams with one exception. The data smoother is cut out or by-passed to give tighter control of the aircraft in tracking localizer beam than in tracking the range beam. In the present embodiment this by-pass action is accomplished by the selectively movable arm 6a. The arm 6a is shifted into engagement with the amplifier tube 8 to send the signal from lead 6 of modulator 20 through the amplifier tube for tracking the localizer beam. On the other hand arm 6a is shifted into engagement with the data smoother 7 through which the signal from modulator 20 is passed for tracking the range beam. The movable arm 6a is actuated by a conventional relay solenoid connected with sequence switch 284.

When the selector switch is moved from one terminal to another, as for example from terminal 282 to 285, the changeover in signal size or strength may be of a great magnitude. This is particularly true when the data smoother is used. The data smoother due, for example, to the thermal time delay tube, has the facility of storage or memory for large signals which may be released at once when the terminals have been shifted.

As an example, when the human pilot has just taken off the field, turned the sequence switch arm to the "warm-up" terminal, and is manually controlling the ship to bracket the beam, he may make much sharper turns than the automatic pilot would make. The automatic pilot which is connected to the radio may interpret this as a large beam overrun. Because of the lag in control signals, when the sequence switch is changed to the range terminal, even though the aircraft is on the beam, a sudden response will be sent to the ailerons and rudder by the automatic pilot as a correction for this imaginary overrun.

As a further example, a large signal change may take place even in flying between stations. When flying between stations with the automatic pilot tracking the range beam, the automatic pilot flies the aircraft on a course that represents a fixed compass heading modified by the range radio beam. This is because the radio range beam propagation results in an erratic beam and if the aircraft were following this beam alone it would be constantly changing directions.

When the human pilot notes that a beam correction is constantly being made at the far end of the working range of the automatic pilot, perhaps because of some wind drift correction, he may desire to remedy this so that beam corrections will be made at the center of the automatic pilot's working range, the working range being fifteen degrees on either side of the compass heading. He turns the switch arm back to terminal 282 and makes a compass heading correction to correct for the wind drift. Then he turns the automatic pilot back to the range terminal. If this new heading correction is suddenly thrust upon the aircraft it may make a sudden lurch. Since the aircraft control system had been at equilibrium under the old condition, the new condition now imposed on the control system demands a different control action upsetting the equilibrium of the system. As soon as the system reaches equilibrium again it will fly smoothly along as before.

Previously, a change was made in the sequence switch as a simple switch, the signal was transferred directly as an immediate response demand to the controls. It resulted, if the response demand was great, in an immediate and violent action of the aircraft control surfaces, providing not only maneuvering hazards to the aircraft but also attendant discomfort and grave psychological reactions on the passengers.

The novel arrangement of the present invention obviates the violent action resulting in a switch from one signal to another by allowing a smooth and gradual application to the controls of any signal which may be selected by the sequence switch arm.

Normally, relay arms 88 and 89 engage contacts 86 and 90. The signal from the autopilot is then communicated by way of conductors 70 and 72 to tube 75 where it is amplified and then by way of conductor 77 impressed on the servomotors for the control of the rudder and aileron surfaces.

As sequence switch arm 283 is moved from one position toward another, as from 282 toward 285, solenoid 101 is relaxed or deenergized allowing relay arms 88 and 89 to break with contacts 80 and 90 and shift into engagement with contacts 87 and 91, respectively. Positive power source B+ impresses a positive charge on plate 93 of capacitor 94, thereby, inducing a negative charge on plate 92.

When the sequence switch arm reaches terminal 285, solenoid 101 is energized shifting relay arms 88 and 89 back into engagement with contacts 86 and 90. The negative charge induced on plate 92 is then transferred by way of contact 86 through conductor 82, resistor 81, and conductors 80 and 72 to grid 74.

As is well known, the plate current of a thermionic tube may be controlled by the negative bias on the grid and may for all practicable purposes be blocked or cut off entirely by a sufficiently great negative charge. Thus, the large negative charge placed on grid 74 by the capacitance 92 will block or cut off any signal from appearing on plate 76. As the negative charge leaks off the capacitor plate 92 through resistor 83 to ground, grid 74 will become less negative, as a consequence a signal will appear on plate 76 of tube 75 and gradually increase to normal signal strength.

Thus a period of time is consumed in leaking off the negative charge on the control grid and in the gradual building up of the signal on the plate from nothing to full strength. Accordingly, the novel arrangement allows only a smooth and gradual application of the new signal to the controls. The values of the condenser 94, the resistor 83, and the charging voltage B+ are chosen, of course, to permit the most desirable time of output cut off and recovery for the tube 75.

Although but one embodiment of the invention has been illustrated and described in detail, various changes and modifications in the form and relative arrangement of parts, which will now appear to those skilled in the art, may be made without departing from the scope of the invention. Reference is therefore to be had to the appended claims for a definition of the limits of the invention.

I claim:

1. In an automatic pilot responsive to various signal conditions for controlling the flight surfaces of an aircraft, comprising means to insert a signal condition on said automatic pilot and then to insert a different signal condition on said automatic pilot, and a means operatively connected with said inserting means and operable to block the control of the flight surfaces including a means connected with said last named means for gradually overcoming said blocking operation to allow control to be resumed upon change from one signal condition to another.

2. A signal controller for the automatic steering apparatus of an aircraft having displaceable control surfaces, comprising an automatic pilot responsive to radiant energy beams transmitted from a remotely located station and adapted to control said surfaces in response to said beams, a means for selecting the beam for the automatic pilot's response, and a means connected with said selecting means and operable by the latter for blocking the control of said surfaces, and a means connected with said last named means for gradually relieving said blocking operation gradually allowing the control to increase to normal.

3. A signal softening device for an automatic pilot capable of producing control signals in response to radiant energy beams of different characteristics originating at remotely located stations, a means to select a predetermined beam characteristic for the response of said automatic pilot, and a means operatively connected with said selection means to block said signals from the automatic pilot and including means connected with said last named means for gradually overcoming said blocking to gradually let the signal increase whereby as a beam selection is made the signal is blocked and then allowed to increase gradually to normal.

4. In a navigation system for an aircraft having displaceable control surfaces thereon and a receiver system capable of receiving selected guide beams transmitted from remotely located stations, an automatic pilot responsive to said receiver for generating a signal to control said surfaces to correct for displacement from selected beams, a means adapted to be connected to said receiving system to change the response of said automatic pilot from one beam reception to another, and a means operatively connected with said changing means and responsive to said changing means to cut off said signal to said surfaces as a selection is being made, and a means connected to said last named means and effective after a selection is made to gradually decrease said cut off action to allow the signal to increase gradually.

5. An automatic pilot system, comprising a control system adapted to respond to guide beams from remotely located stations for developing control signals, selector means having a plurality of stations corresponding to different beams and a selecting means for selecting one of said stations whereby said control system responds to a selected beam, a servomotor, means connecting said servomotor and said control system for transmitting said signals to said servomotor including means connected with said selector means and rendered effective upon the changing of said selecting means from one station to another for blocking said signal transmission, and means connected with said last named means and said selector means and rendered effective when said other station is reached to reduce said blocking gradually.

6. An automatic steering system for an aircraft having a movable control surface thereon, comprising a servomotor operatively connected with said surface for controlling the latter, a control system capable of responding to a plurality of guide beams having different characteristics transmitted from remotely located stations for developing control signals for said servomotor, selector means connected with said control system for selecting the beams to which said control system is to respond, means operatively connecting said control system and said servomotor for operating the latter from said signal and including means connected with said selector means and rendered effective by said selector means for initially blocking the signal to said servomotor as a selection from one beam to another is made to soften the effect of a change from one beam characteristic to another and rendered gradually ineffective for blocking said signal after the selection has been made whereby said servomotor is operated in a normal manner thereafter.

7. An automatic steering system for an aircraft having a movable control surface thereon, comprising a servomotor operatively connected with said surface for controlling the latter, a control system capable of responding to a plurality of guide beams transmitted from remotely located stations for developing control signals for said servomotor, selective means operatively connected with said control system for selecting the beams to which said control system is to respond, means operatively connecting said control system and said servomotor for operating the latter from said signal and including thermionic means, means connected with said selective means and said thermionic means for biasing said thermionic means to block the signal to said servomotor as a selection from one beam to another is made, and means also connected with said selective means and said thermionic means for rendering said bias gradually ineffective on said thermionic means after the selection has been made.

8. An automatic steering system for an aircraft having a movable control surface thereon, comprising a servomotor operatively connected with said surface for controlling the latter, a control system capable of responding to a plurality of guide beams transmitted from remotely located stations for developing control signals for said servomotor, selective means operatively connected with said control system for selecting the beams to which said control system is to respond, means operatively connecting said control system and said servomotor for operating the latter from said signal and including thermionic means, a capacitance operatively connected with said thermionic means, means connected with said selective means and said capacitance for charging said capacitance to block the signal to said servomotor as a selection from one beam to another is made, and means also connected with said selective means and capacitance for rendering said charge gradually ineffective on said thermionic means after the selection has been made.

9. In a system having a controlling element and a controlled element, means capable of communicating one of a plurality of signals representing different conditions from the controlling element to the controlled element, means connected with said last named means for selecting the signal condition for the controlled element, a relay operable as said selecting means is actuated, and means associated with the relay means for blocking the signal from the controlling element and gradually introducing the signal to the controlled element, said last named means including a thermionic tube having anode, cathode and control grid elements, with said anode being operatively connected to said controlled element and said grid being operatively connected to said controlling element and said grid being connected with said relay, blocking means connected with said thermionic tube and said relay for blocking said signal as a new signal condition is selected and said relay operated, and means for slowly relieving said blocking action as said new signal is applied to grid whereby said new signal slowly builds up on said grid.

10. A system for steering an aircraft in response to guide beams of different characteristics originating at remotely located transmitting stations, comprising first means for operating the surfaces of said aircraft to guide the aircraft along a selected beam, second means operatively connected with said first means for conditioning the latter to operate said surfaces in accordance with a selected beam, said first means operating said surfaces rapidly in response to deviations from a selected guide beam to correct for the deviation, and means operated by said second means and operatively connected with said first means to soften the change from one beam to another by initially blocking the operation of said surfaces when a change is made from one selected beam to another and then gradually establishing normal operation of said surfaces so that corrections may thereafter be made at a normal rate upon deviation from the selected beam.

11. A system for steering an aircraft in response to guide beams of different characteristics originating at remotely located stations, comprising first means adapted for operating the surfaces of said craft in response to a signal corresponding to the deviation from a guide beam to maintain the craft thereon, selector means connected with said first means for conditioning the latter to operate said surfaces in accordance with deviations from a predetermined beam, said first means normally operating said surfaces rapidly to correct for said deviations, and means for softening the effect of a change from one predetermined beam to another including thermionic means through which said signal is transmitted and means operatively connected with said selector means for initially blocking the passage of signals through said thermionic means when a change is made from one beam characteristic to another and for gradually removing the blocking so that said signals gradually increase to normal to correct for deviations at a normal rate.

References Cited in the file of this patent

UNITED STATES PATENTS

| | | |
|---|---|---|
| 2,313,666 | Peterson | Mar. 9, 1943 |
| 2,322,225 | Crane | June 22, 1943 |
| 2,429,642 | Newton | Oct. 28, 1947 |
| 2,466,702 | Hamby | Apr. 12, 1949 |
| 2,496,809 | Moseley | Feb. 7, 1950 |
| 2,546,338 | Glasford | Mar. 27, 1951 |
| 2,548,278 | Wirkler | Apr. 10, 1951 |
| 2,570,905 | Young et al. | Oct. 9, 1951 |
| 2,575,890 | Perkins et al. | Nov. 20, 1951 |
| 2,576,135 | Moseley | Nov. 27, 1951 |
| 2,585,162 | Noxon | Feb. 12, 1952 |
| 2,592,173 | Noxon et al. | Apr. 8, 1952 |
| 2,610,260 | Moffett | Sept. 9, 1952 |
| 2,611,128 | Pine et al. | Sept. 16, 1952 |
| 2,612,331 | Frazier et al. | Sept. 30, 1952 |
| 2,657,304 | Parks | Oct. 27, 1953 |